US011434164B2

(12) United States Patent
Goel

(10) Patent No.: US 11,434,164 B2
(45) Date of Patent: Sep. 6, 2022

(54) A12O3 RICH HARD AND CRACK RESISTANT GLASSES AND GLASS-CERAMICS

(71) Applicant: Rutgers, The State University of New Jersey, New Brunswick, NJ (US)

(72) Inventor: Ashutosh Goel, Edison, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 10 days.

(21) Appl. No.: 16/754,159

(22) PCT Filed: Oct. 9, 2018

(86) PCT No.: PCT/US2018/055035
§ 371 (c)(1),
(2) Date: Apr. 7, 2020

(87) PCT Pub. No.: WO2019/074939
PCT Pub. Date: Apr. 18, 2019

(65) Prior Publication Data
US 2022/0017406 A1   Jan. 20, 2022

Related U.S. Application Data

(60) Provisional application No. 62/569,825, filed on Oct. 9, 2017.

(51) Int. Cl.
*C03C 3/15* (2006.01)
*C03C 3/068* (2006.01)
*C03C 10/02* (2006.01)
*C03B 27/012* (2006.01)
*C03C 3/19* (2006.01)
*C03C 10/00* (2006.01)

(52) U.S. Cl.
CPC .............. *C03C 3/15* (2013.01); *C03B 27/012* (2013.01); *C03C 3/19* (2013.01); *C03C 10/0054* (2013.01)

(58) Field of Classification Search
CPC ....... C03C 3/15; C03C 10/00; C03C 10/0036; C03C 10/0045
See application file for complete search history.

(56) References Cited

U.S. PATENT DOCUMENTS 3,174,871 A   3/1965  Geffcken et al.
3,804,646 A   4/1974  Dumbaugh, Jr.
(Continued)

FOREIGN PATENT DOCUMENTS

CN        101376563 A    3/2009
DE    102010012453 A1   10/2010

OTHER PUBLICATIONS

Rosales-Sosa, et al: "Crack-Resistant Al2O3-SiO2 Glasses," Scientific Reports, Apr. 7, 2016, vol. 6, Art. No. 23620; DOI: 10.1038/srep23620.
(Continued)

*Primary Examiner* — Karl E Group
(74) *Attorney, Agent, or Firm* — Fox Rothschild LLP

(57) ABSTRACT

$Al_2O_3$— rich compositions with desirable hardness and crack resistance for various functional applications. Also disclosed is a method of manufacturing the composition into various dimensions and shapes under a temperature much lower than in conventional methods.

20 Claims, 1 Drawing Sheet

Vickers indent on MYAB glass

Vickers indent on Borofloat®33 glass

Vickers indent on silica glass

(56) References Cited

U.S. PATENT DOCUMENTS

| | | | |
|---|---|---|---|
| 4,042,405 A | 8/1977 | Krohn et al. | |
| 5,378,662 A | 1/1995 | Tsuyuki | |
| 5,747,397 A | 5/1998 | McPherson et al. | |
| 5,849,649 A | 12/1998 | Poole | |
| 7,291,571 B2* | 11/2007 | Sprenger | C03C 3/062 501/78 |
| 7,906,444 B2* | 3/2011 | Liebald | F41H 5/0435 89/36.02 |
| 7,910,505 B2* | 3/2011 | Seneschal-Merz | C03C 3/062 65/33.1 |
| 9,000,667 B2* | 4/2015 | Zhou | C03C 17/09 315/1 |
| 2004/0152034 A1 | 8/2004 | Cummings et al. | |
| 2006/0166804 A1* | 7/2006 | Sprenger | C03C 3/062 501/9 |
| 2007/0281851 A1* | 12/2007 | Seneschal-Merz | C03C 3/062 252/301.4 F |
| 2008/0041106 A1* | 2/2008 | Seneschal-Merz | C03B 32/02 252/301.4 F |
| 2009/0156384 A1* | 6/2009 | Liebald | C03C 14/002 501/2 |
| 2010/0086846 A1* | 4/2010 | Kumar | C03C 8/24 429/185 |
| 2012/0126172 A1* | 5/2012 | Zhou | C09K 11/778 65/32.5 |
| 2014/0342897 A1 | 11/2014 | Amin et al. | |
| 2016/0137542 A1 | 5/2016 | Castillo | |
| 2019/0218136 A1* | 7/2019 | Aitken | C03C 3/145 |

OTHER PUBLICATIONS

Januchta et al., "Discovery of Ultra-Crack-Resistant Oxide Glasses with Adamptive Networks" Chem Mater., Jun. 2017, vol. 29, pp. 5865-5876, DOI: 10.1021/acs.chemmater.7b00921.

* cited by examiner

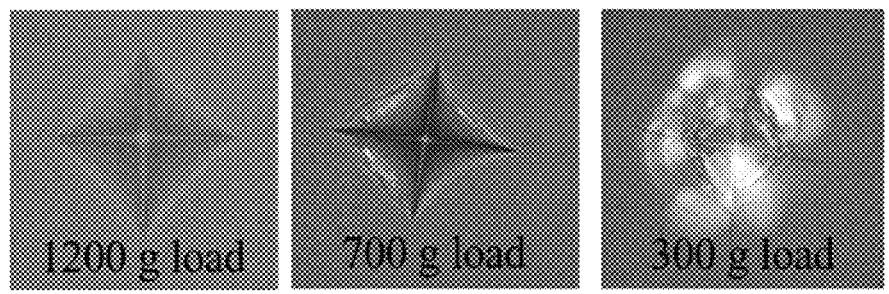

Al2O3 RICH HARD AND CRACK RESISTANT GLASSES AND GLASS-CERAMICS

CROSS-REFERENCE TO RELATED APPLICATION

The present application claims priority benefit under 35 U.S.C. § 119(e) of U.S. Patent Application Ser. No. 62/569,825 filed Oct. 9, 2017, the disclosure of which is incorporated by reference herein in its entirety.

TECHNICAL FIELD

Disclosed herein are novel glass compositions with high hardness and higher crack resistance than other commercially available conventional glasses.

BACKGROUND

Brittleness of glass has been perceived as its gravest handicap. Over the centuries, accepting this handicap and benefitting from optical properties and universal processability, glasses have found their role in applications with low levels of tensile stress.

Highly crack resistant glasses find applications in various fields. It is generally accepted that hardness and crack resistance are inversely proportional to each other. In other words, it is difficult to obtain a "hard" and "crack resistant" glass. However, a recent study has proved this hypothesis to be incorrect as they have shown that it is possible to obtain glass compositions in $Al_2O_3$—$SiO_2$ binary system with both high hardness (~8 GPa) and crack resistance (Rosales-Sosa et al., *Sci. Rep.*, 6 (2016) 23620). Although interesting, the binary system in the study has little practical implications because of the high temperatures (>1800° C.) required to synthesize these glass compositions. Because of this constraint, the as synthesized glasses can only be produced in small shapes and dimensions (for example, circular discs of few millimeter in diameter).

It is therefore desirable to identify compositions that are intrinsically resistant to formation of cracks without losing the hardness. It is further desired that such glasses be manufactured under a cost effective manner.

SUMMARY

This document discloses novel glass compositions with desirable hardness and crack resistance for various applications. An aspect of the disclosure provides a glass composition comprising oxides of a lanthanide, aluminum and boron, wherein the aluminum oxide is present in an amount ranging from about 20 mol % to about 60 mol %. In some embodiments, the aluminum oxide is present in an amount ranging from about 30 mol % to about 45 mol %.

In some embodiments, the composition further contains an alkaline earth metal oxide. In some embodiments, the alkaline earth metal oxide is selected from magnesium oxide, calcium oxide, strontium oxide and barium oxide, or a combination thereof. In some embodiments, the alkaline earth metal oxide is MgO ranging from about 2 mol % to about 25 mol %. In some embodiments, the alkaline earth metal oxide is selected from magnesium oxide, calcium oxide and a combination of both.

In some embodiments, the lanthanide oxide is selected from lanthanum oxide, yttrium oxide and neodymium oxide. In some embodiments, the lanthanide oxide is present in an amount ranging from about 5 mol % to about 30 mol %. In some embodiments, the lanthanide oxide is $La_2O_3$ ranging from about 5 mol % to about 25 mol %. In some embodiments, the lanthanide oxide is $Y_2O_3$ ranging from about 5 mol % to about 20 mol %.

In some embodiments, the boron oxide is present in an amount ranging from about 30 mol % to about 70 mol %. In some embodiments, the composition contains $P_2O_5$ ranging from about 1 mol % to about 5 mol %. In some embodiments, the composition contains $TiO_2$ ranging from 1 mol. % to 10 mol. %. In some embodiments, the composition further contains $Nb_2O_5$ or $Ta_2O_5$ or mixture of both ranging from 1 mol. % to 10 mol. %.

In some embodiments, the composition has a density less than about 3.5 g/cm$^3$. In some embodiments, the composition has a density ranging from about 2.0 to about 3.0 g/cm$^3$. In some embodiments, the composition has a Vickers hardness of more than about 7 GPa at about 200 g load. In some embodiments, the composition does not develop cracks until about more than 2000 gf load. In some embodiments, the composition is substantially free from $SiO_2$. In some embodiments, the composition further contains $SiO_2$ ranging from about 1 mol % to about 5 mol %.

Another aspect of the disclosure provides an article of manufacture containing the composition described herein.

Another aspect of the disclosure provides a method of manufacturing the composition described herein. The method includes (a) heating at a temperature ranging from about 1300 to about 1700° C. a mixture comprising an oxide, carbonate, and/or nitrate of alkaline-earth, lanthanide, aluminum, and/or boron to obtain a melt, wherein the aluminum oxide is present in an amount ranging from about 20 mol % to about 60 mol %; and (b) quenching the melt. In some embodiments, the temperature ranges from about 1400 to about 1700° C.

In some embodiments, the method further includes quenching the melt between two metallic plates or quenching by jet of compressed air. In some embodiments, the method further includes annealing at the melt at temperatures above, below or equal to its glass transition temperature.

BRIEF DESCRIPTION OF THE DRAWING

FIG. illustrates an exemplary glass of the present invention in comparison with conventional glass.

DETAILED DESCRIPTION

Novel crack and damage resistant glass and glass ceramic composition for various applications are disclosed. The manufacturing of the composition requires only mild conditions, which are suitable for the production of articles of different dimensions and shapes.

The articles "a" and "an" as used herein refers to "one or more" or "at least one," unless otherwise indicated. That is, reference to any element or component of an embodiment by the indefinite article "a" or "an" does not exclude the possibility that more than one element or component is present.

The term "about" as used herein refers to the referenced numeric indication plus or minus 10% of that referenced numeric indication.

The needs of industry for more damage resistant articles and devices are met by the use of the glass or glass ceramic comprising the composition disclosed herein. The composition possesses certain advantages such as improved damage/crack and hardness over other commercially available glass or glass ceramic materials.

One aspect provides a glass or glass ceramic composition including lanthanide oxide, aluminum oxide, and boron oxide, wherein the aluminum oxide is present in an amount ranging from about 20 mol % to about 60 mol % of the oxides.

Aluminum oxide ($Al_2O_3$) plays an important role in the hardness and damage resistance of the glass composition as has been shown in the recent literature [Januchta et al., *J. Non-Cryst. Solids* 460 (2017) 54; Januchta et al., *Chem. Mater.* 29 (2017) 5865-5876]. In glass or glass-ceramic compositions, $Al_2O_3$ and other oxides may each be in a glass state, crystalline state, or portions in a glass state and portions in a crystalline state. In some embodiments of the present invention, the content of $Al_2O_3$ ranges from about 20 mol % to about 60 mol %, from about 30 mol % to about 60 mol %, from about 25 mol % to about 55 mol %, from about from about 30 mol % to about 50 mol %, from about from about 30 mol % to about 45 mol %, from about from about 35 mol % to about 45 mol %, or from about from about 30 mol % to about 40 mol %, all sub-ranges and sub-values included, of the total molar amount of the all the metal oxides in the composition.

$Al_2O_3$ can be prepared through known reaction procedures or obtained from any commercial sources. Materials containing $Al_2O_3$ include for example, bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.))

Compositions containing $B_2O_3$ often exhibit lower atomic packing density. This may be helpful in lowering the brittleness of glass. In addition, it is a component which acts as a flux to lower the viscosity and thereby facilitate melting of the glass. In some embodiments, the content of $B_2O_3$ ranges for example from about 30 mol % to about 70 mol % in the oxide mixture. Materials containing $B_2O_3$ or serving as a source/precursor (e.g. $H_3BO_3$) can be prepared in situ or obtained from commercial sources. In some embodiments, the $B_2O_3$ ranges from about 35 mol % to about 65 mol %, from about 40 mol % to about 65 mol %, from about 45 mol % to about 65 mol %, from about 45 mol % to about 55 mol %, or from about 40 mol % to about 60 mol % of the total molar amount of the metal oxides.

Lanthanide oxide addition helps in increasing the thermal stability of glass leading to a higher glass forming ability. One or more lanthanide oxides can be incorporated into a glass composition. Non-limiting examples of lanthanide oxides include lanthanum oxide, yttrium oxide and neodymium oxide. One or more lanthanide oxides can be included in the oxide mixture. The content of each lanthanide oxide independently ranges for example from about 5 mol % to about 30 mol %, from about 5 mol % to about 20 mol %, from about 5 mol % to about 15 mol %, from about 5 mol % to about 10 mol % % of the total molar amount of the metal oxides.

In some embodiments, the glass composition further contains an oxide of an alkaline earth metal. Non-limiting examples of such oxides include MgO, CaO, BaO and SrO. The oxides may lower the high-temperature viscosity of the glass without a drop of the strain point and thereby facilitates melting of the glass. Further, they can promote the stability of the glass and serves to increase the content of $Al_2O_3$ in the composition. The high ionic field strength of alkaline-earth cations helps in increasing the hardness of $Al_2O_3$ containing glasses by inducing the formation of five-coordinated aluminum species in the glass structure. In some embodiments, the composition includes 1, 2, 3, or 4 alkaline earth metal oxides, each independently in an amount ranging from about 2 mol % to about 25 mol %, from about 5 mol % to about 20 mol %, from about 5 mol % to about 15 mol %, or from about 10 mol % to about 15 mol % of the total molar amount of the metal oxides. In some embodiments, the composition includes MgO. In some embodiments, the composition includes the combinations of alkaline-earth oxides.

The composition can also include $P_2O_5$ ranging from about 1 mol % to about 10 mol %. In some embodiments, $P_2O_5$ ranges from about 1 mol % to about 5 mol %, from about 2 mol % to about 5 mol %, or from about 1 mol % to about 3 mol % of the total molar amount of the metal oxides.

In some embodiments, the composition further contains $TiO_2$ ranging from 1 mol % to 10 mol % of the total molar amount of the metal oxides. In some embodiments, the composition further contains $Nb_2O_5$ or $Ta_2O_5$ or mixture of both ranging from 1 mol % to 10 mol % of the total molar amount of the metal oxides.

In some embodiments, the composition is substantially free from $SiO_2$. In some embodiments, the composition further contains $SiO_2$ ranging from about 1 mol % to about 5 mol % of the total molar amount of the metal oxides. In some embodiments, the oxides of the composition of the present invention consist essentially of rare-earth oxide, aluminum oxide, and boron oxide.

The composition may further contain additional components depending on the specific applications of the glass or glass ceramic product. In some embodiments, the composition further includes one or more alkali metal oxides such as potassium oxide and lithium oxide. The composition may contain components including a coloring component, a ceramic filler and/or a heat resistant pigment. Examples of said other components include a coloring component such as $Fe_2O_3$ and NiO. Examples of the heat resistant pigment include a Cu—Cr—Mn—O type heat resistant black pigment, a Cu—Cr—O type heat resistant black pigment, a Co—V—Fe—O type heat resistant violet pigment, a Cr—O type heat resistant green pigment and a Co—O type heat resistant green pigment.

In some embodiments, the composition does not develop cracking until more than about 2000 gf load. One measure of crack resistance is the load required to generate median/radial cracks using a Vicker's diamond indenter. The glass composition disclosed herein exhibits a Vickers crack initiation load which is greater than 1000, 1500, 1800, 2000, 2200, or 2500 gf load.

Meanwhile, the Vickers hardness of the glass composition described herein ranges from about 7 GPa to about 9 GPa, from about 7 GPa to about 8 GPa, from about 7 GPa to about 7.5 GPa, from about 7.5 GPa to about 8 GPa, or from about 8 GPa to about 8.5 GPa. In some exemplary embodiments, the Vickers hardness is more than about 7 GPa at about 200 g load.

Other desirable properties of the glass composition include: (1) a Vickers hardness of more than about 7 GPa at about 200 g load; (2) a Young's modulus value of less than about 100, less than about 110, less than about 120, less than about 130, less than about 140, or less than about 150 GPa; and, (3) a density of less than about 3.5 $g/cm^3$.

The composition exhibiting desirable mechanical properties also has a density much lower than other reported compositions with similar hardness or crack resistance. In some embodiments, the density ranges from about 2 to about 4 g/cm$^3$, from about 2.5 to about 3.5 g/cm$^3$, or from about 2.5 to about 3 g/cm$^3$. In some embodiments, the density is less than about 4, less than about 3.5, less than about 3, less than about 2.5, or less than about 2 g/cm$^3$.

In some exemplary embodiments, the composition comprises or consists essentially of $La_2O_3$, $Al_2O_3$, and $B_2O_3$. In some exemplary embodiments, the composition comprises or consists essentially of $Y_2O_3$, $Al_2O_3$, and $B_2O_3$. In some exemplary embodiments, the composition comprises or consists essentially of MgO, $Y_2O_3$, $Al_2O_3$, and $B_2O_3$. In some exemplary embodiments, the composition comprises or consists essentially of $La_2O_3$, $Al_2O_3$, $P_2O_5$ and $B_2O_3$. In some exemplary embodiments, the composition comprises $La_2O_3$, $Al_2O_3$, $TiO_2$ and $B_2O_3$. In some exemplary embodiments, the composition consists essentially of $La_2O_3$, $Al_2O_3$, $TiO_2$ and $B_2O_3$.

Depending the intended application, the composition can be in the form of glass or glass-ceramics. Glass-ceramics can be formed using the same processes that are applicable to glass. To convert them from a vitreous glass material into a vitro-crystalline glass-ceramic material, glass either needs to be heat treated above its glass transition temperature, or the melt needs to be cooled slowly in order to induce nucleation and crystal growth.

Another aspect provides a glass or glass ceramic composition including aluminum oxide and an alkaline earth metal oxide. In some embodiments, the alkaline earth metal oxide is MgO, CaO, BaO or SrO.

In some embodiments, the composition includes $Al_2O_3$ and CaO, and optionally a second alkaline earth metal oxide selected from the group consisting of MgO, BaO or SrO, wherein the $Al_2O_3$ is present in an amount ranging from about 40 mol % to about 60 mol % of the oxides. In some embodiments, the composition includes $Al_2O_3$, CaO, and MgO, wherein the $Al_2O_3$ ranges from about 40 mol % to about 50 mol %, Cao ranges from 40 mol % to 50 mol %, and MgO ranges from about 8 mol % to about 12 mol %. In some embodiments, the composition includes about 42 mol % of $Al_2O_3$, about 47 mol % CaO, and about 10 mol % MgO. In some embodiments, the composition further includes about 2 to 4 mol % $SiO_2$.

Another aspect provides an article of manufacture containing the composition described herein, which are of great application in many fields such as medical, optics, sports, military, aerospace, wearable fabrics and energy applications. Advantages of the composition described herein include various desirable mechanical properties as well as low cost manufacturing and adaptability. The materials made from the composition can be in any form or size as needed such as particles, beads, fibers, sheets, blocks, etc. Articles containing the composition described herein include, for example, reinforcement material, and/or matrix material. For example, glass or glass ceramics made according to the present invention can be in the form of particles and/or fibers suitable for use as reinforcing materials in composites (e.g., ceramic, metal, or polymeric (thermosetting or thermoplastic)). The particles and/or fibers may, for example, increase the modulus, heat resistance, wear resistance, and/or strength of the matrix material. Examples of uses of the composition in reinforced polymeric materials (i.e., reinforcing particles made according to the present invention dispersed in a polymer) include protective coatings, for example, for concrete, furniture, floors, roadways, wood, wood-like materials, ceramics, and the like, as well as, anti-skid coatings and injection molded plastic parts and components.

The composition can also be used as a matrix material. Examples of useful articles comprising such materials include composite substrate coatings, cutting tool inserts abrasive agglomerates, and bonded abrasive articles such as vitrified wheels, transparent armor in defense automobiles, and electronic packaging.

Another aspect of the document provides a method of manufacturing the above-described composition. The process for preparing the compositions typically includes a number of different steps. Generally, a batch of oxide mixture with a predetermined amount of individual oxide is melted. Batches can be prepared from inexpensive, readily available raw materials such as sand, soda ash, potash, fluorspar, and magnesia, which can be formed into a powder using any suitable technique such as milling or grinding in a mortar. An oxide can be directly blended into the mixture. Alternatively, an oxide can be obtained by heating a precursor to its decomposition temperature in order to remove any water or gases. For example, MgO can be derived in situ from carbonates, nitrates or any other source of magnesium under heating. Similarly, $H_3BO_3$ is a suitable precursor for $B_2O_3$. In some embodiments, the mixture comprises a lanthanide oxide, aluminum oxide, and boron oxide. In some embodiments, the mixture comprises a lanthanide oxide, aluminum oxide, boron oxide, and an alkaline earth metal oxide. In some embodiments, the oxides in the mixture consists essentially of a lanthanide oxide, aluminum oxide, and boron oxide. In some embodiments, the oxides in the mixture consists essentially of a lanthanide oxide, aluminum oxide, boron oxide, and an alkaline-earth metal oxide. In some embodiments, the mixture comprises aluminum oxide, one, two or three alkaline earth metal oxide, and optionally silicon dioxide. The amount of each individual oxide is as described above for the composition. In some embodiments, the manufacturing process employs a melt-quench technique to obtain a monolith, which can facilitate the increase of aluminum oxide concentration in the glass or glass ceramics composition.

Melting can be brought about by heating the pre-determined composition to about 1300 to about 1700° C. for a suitable amount of time. For example, the predetermined composition can be placed in a crucible and heated in an electric furnace. Exemplary ranges of the temperature include from about 1400 to about 1700° C., from about 1500 to about 1700° C., from about 1600 to about 1700° C. In some embodiments, the heating lasts for about 1, 3, 5, 7, or 10 hours.

The obtained melt is then transferred to a container, plate or substrate for quenching and further processing into a desired shape and size. In some embodiments, melted composition (i.e., the melt) is then poured into a mold (e.g., a graphite mold) to provide a desired shape, after which the melt is furnace-cooled to room temperature to provide a glass. In some embodiments, the melt is splat quenched between two plates to obtain transparent and/or amorphous glasses. In some embodiments, the melt is poured on a plate followed by annealing at temperature close to its glass transition temperatures.

The composition can be subjected to heat treatment in order to cause crystallization and/or convert the glass to a glass ceramic. The heat treatment can include reheating of the glass in a variety of different ways. For example, the glass can be reheated to a single temperature from about 500° C. to about 1000° C. for a period of time sufficient to cause the growth of crystals in situ. Alternately, the glass can be heat treated for a time at a first temperature, and then heat treated for an additional period of time at a second, higher temperature. The periods of heating can have various durations from about 1 to about 5 hours, and the heat can be changed from the first temperature to the second temperature at a rate from about 1° C./min to about 30° C./min. The first heat treatment step can be carried out at a temperature from about 700° C. to 850° C., with a temperature of about 800° C. being preferred. The second heat treatment step can be carried out at a temperature from about 825 to about 950° C., with a range from about 850 to about 925° C. being preferred. Multi-step heating can be applied if necessary. It is understood by those skilled in the art that the first heat treatment step provides nucleation, while the second heat treatment step provides crystal growth on the earlier formed nuclei, and that crystallization is typically more uniform and fine-grained if the heat treatment of the glass is undertaken in two stages.

The initial batch of oxide mixture may include one or more additional components. Alternatively, the additional component can be added at any stage of the manufacturing process.

Table 1 below compares a glass composition of the present invention with other conventional glasses in terms of density, hardness, Young's modulus and Shear modulus. FIG. 1 further illustrates the excellent property of the present invention in comparison with other glasses on the market.

TABLE 1

Comparison of mechanical properties
The MYAB glass comprises MgO (10.00 mol. %), $Y_2O_3$ (9.60 mol. %),
$Al_2O_3$ (34.90 mol. %), and $B_2O_3$ (45.50 mol. %).

| Property | MYAB | Borofloat ®33 | Silica | Eagle ® XG |
|---|---|---|---|---|
| Density | 2.76 g/cm$^3$ | 2.23 g/cm$^3$ | 2.20 g/cm$^3$ | 2.38 g/cm$^3$ |
| Vickers Hardness (200 g) | 7.5 GPa | 5.51 GPa | 7.30 GPa | 6.27 GPa |
| Young's modulus | 102.0 GPa | 63.1 GPa | 72.0 GPa | 73.6 GPa |
| Shear modulus | 39.6 GPa | 26.7 GPa | — | 30.1 GPa |

It will be appreciated by persons skilled in the art that compositions described herein are not limited to what has been particularly shown and described. Rather, the scope of the compositions is defined by the claims which follow. It should further be understood that the above description is only representative of illustrative examples of embodiments. The description has not attempted to exhaustively enumerate all possible variations. The alternate embodiments may not have been presented for a specific portion of the composition, and may result from a different combination of described portions, or that other un-described alternate embodiments may be available for a portion, which is not to be considered a disclaimer of those alternate embodiments. It will be appreciated that many of those un-described embodiments are within the literal scope of the following claims, and others are equivalent.

The invention claimed is:

1. A glass or glass ceramic composition comprising a lanthanide oxide, aluminum oxide, boron oxide, and an alkaline earth metal oxide selected from the group consisting of magnesium oxide, calcium oxide, and a combination thereof, wherein the aluminum oxide is present in an amount ranging from about 30 mol % to about 60 mol %.

2. The glass or glass ceramic composition of claim 1, wherein the aluminum oxide is present in an amount ranging from about 30 mol % to about 45 mol %.

3. The glass or glass ceramic composition of claim 1, comprising magnesium oxide ranging from about 8 mol % to about 12 mol %.

4. The glass or glass ceramic composition of claim 3, further comprising calcium oxide ranging from about 40 mol % to about 50 mol %.

5. The glass or glass ceramic composition of claim 3, wherein the oxide of the alkaline earth metal is present in an amount ranging from about 1 mol % to about 25 mol %.

6. The glass or glass ceramic composition of claim 1, wherein the alkaline earth metal oxide is MgO ranging from about 2 mol % to about 25 mol %.

7. The glass or glass ceramic composition of claim 1, wherein the lanthanide oxide is selected from the group consisting of lanthanum oxide and yttrium oxide.

8. The glass or glass ceramic composition of claim 1, wherein the lanthanide oxide is present in an amount ranging from about 5 mol % to about 30 mol %.

9. The glass or glass ceramic composition of claim 1, wherein the oxide of the lanthanide is $La_2O_3$ ranging from about 5 mol % to about 25 mol %.

10. The glass or glass ceramic composition of claim 1, wherein the oxide of the lanthanide is $Y_2O_3$ ranging from about 5 mol % to about 20 mol %.

11. The glass or glass ceramic composition of claim 1, wherein the boron oxide is present in an amount ranging from about 35 mol % to about 65 mol %.

12. The glass or glass ceramic composition of claim 1, further comprising $P_2O_5$ ranging from about 1 mol % to about 5 mol %.

13. The glass or glass ceramic composition of claim 1, further comprising $TiO_2$ ranging from about 1 mol % to about 10 mol %.

14. The glass or glass ceramic composition of claim 1, further comprising at least one of $Nb_2O_5$ and $Ta_2O_5$, each independently ranging from about 1 mol % to about 10 mol %.

15. The glass or glass ceramic composition of claim 1, wherein the respective amounts of lanthanide oxide, aluminum oxide, boron oxide, and alkaline earth metal oxide are selected so that the glass or glass ceramic composition has a density of less than about 3.5 g/cm$^3$.

16. The glass or glass ceramic composition of claim 1, wherein the respective amounts of lanthanide oxide aluminum oxide, boron oxide, and alkaline earth metal oxide are selected so that the glass or glass ceramic composition a density of ranging from about 2.0 to about 3.0 g/cm$^3$.

17. The glass or glass ceramic composition of claim 1, wherein the respective amounts of lanthanide oxide aluminum oxide, boron oxide, and alkaline earth metal oxide are selected so that the glass or glass ceramic composition has a Vickers hardness of more than about 7 GPa at about 200 g load.

18. The glass or glass ceramic composition of claim 1, wherein the respective amounts of lanthanide oxide, aluminum oxide, boron oxide, and alkaline earth metal oxide are selected so that the glass or glass ceramic composition does not develop cracking until about more than 1000 gf load.

19. An article of manufacture comprising the glass or glass ceramic composition of claim 1.

20. A method of manufacturing the glass or glass ceramic composition of claim 1, comprising
  (a) heating at a temperature ranging from about 1300 to about 1700° C. a mixture comprising a lanthanide oxide, aluminum oxide, boron oxide, and an alkaline earth metal oxide selected from the group consisting of magnesium oxide, calcium oxide, and a combination thereof to obtain a melt, wherein the aluminum oxide is present in an amount ranging from about 30 mol % to about 60 mol %; and
  (b) quenching the melt in a desired shape and size.

\* \* \* \* \*